United States Patent [19]

Hirasawa et al.

[11] Patent Number: 5,031,933
[45] Date of Patent: Jul. 16, 1991

[54] SEAT BELT SUPPORT STRUCTURE

[75] Inventors: Kiyoshi Hirasawa, Hamamatsu; Nobunari Yamamoto, Hamana, both of Japan

[73] Assignee: Suzuki Motor Company Limited, Shizuokos, Japan

[21] Appl. No.: 537,360

[22] Filed: Jun. 13, 1990

[30] Foreign Application Priority Data

Jun. 14, 1989 [JP] Japan .................... 1-69183[U]

[51] Int. Cl.⁵ .............................. B60R 22/00
[52] U.S. Cl. .................... 280/808; 280/801
[58] Field of Search ............ 280/803, 808, 801

[56] References Cited

U.S. PATENT DOCUMENTS 4,473,243  9/1984  Ogawa et al. ............... 280/808
4,723,793  2/1988  Kato et al. .................. 280/808
4,880,254 11/1989  Muller ........................ 280/808

Primary Examiner—Kenneth R. Rice

[57] ABSTRACT

The present invention provides a seat belt support structure wherein a bracket is fixedly secured on a door sash for holding an anchor plate which supports the seat belt, the seat belt support structure being characterized in that said bracket for fixedly securing the anchor plate is attached to the inner surface of the outer panel of said door sash and its attachment portion is concealed by a door glass run which is used to hold the door window glass, resulting in that screws do not project outwardly through the inner panel and a smooth sealing surface is ensured to seal a clearance between the door sash and the center pillar. Sealing members can thus be easily arranged and it is possible to improve sealing characteristics of the vehicle.

2 Claims, 2 Drawing Sheets

FIG. I
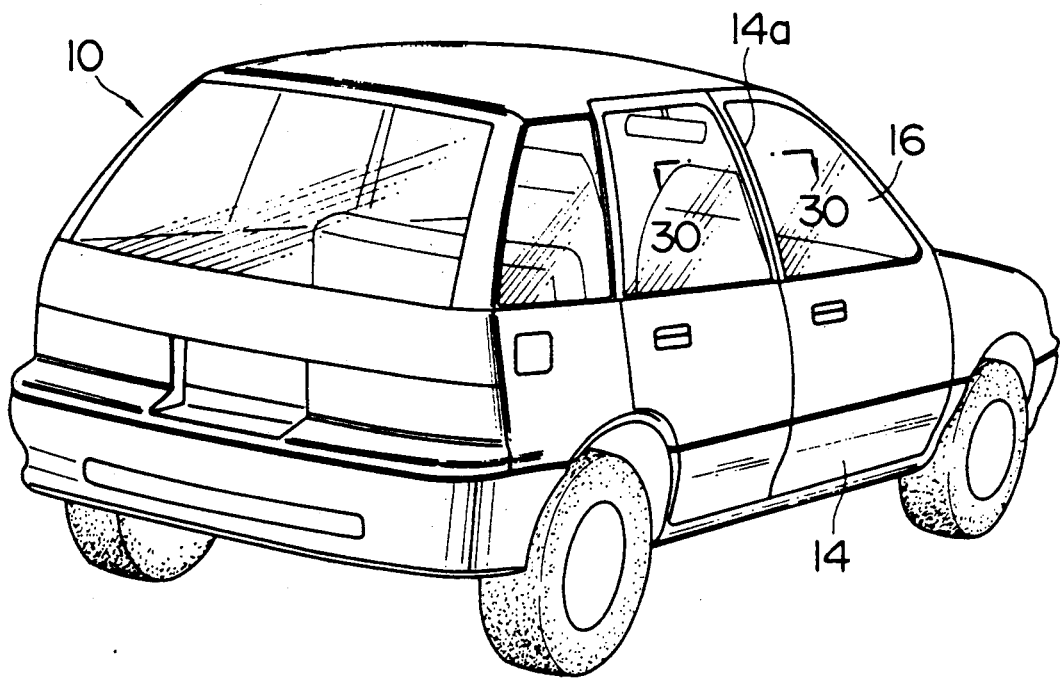
FIG. 2
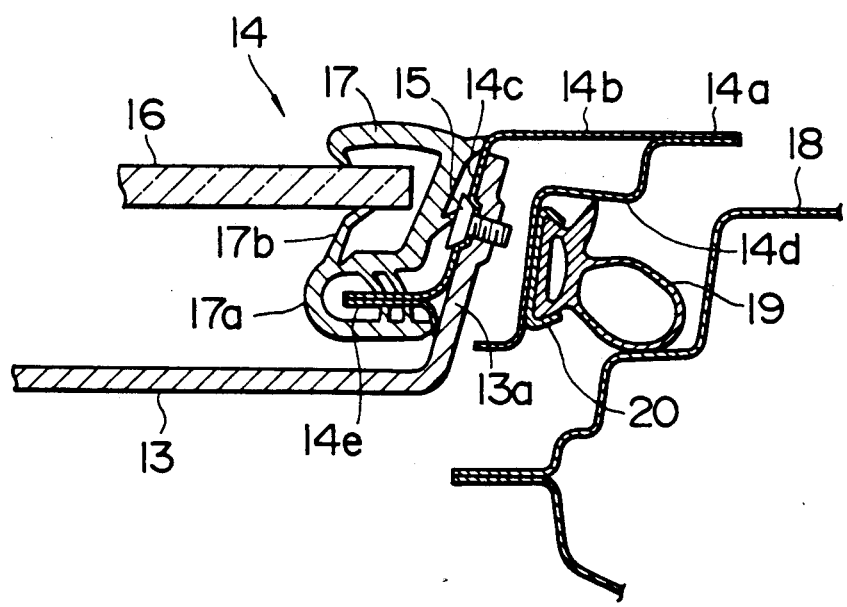

SEAT BELT SUPPORT STRUCTURE

FIELD OF THE INVENTION AND RELATED ART STATEMENT

The present invention relates to a seat belt support structure.

Various types of seat belt supports are used today in motor vehicles as the use of a seat belt has been made mandatory for occupants to ensure safety against accident during driving. However, drivers after do not wear such seat belts merely for the reason of the inconveniency accompanied inconvenience. Thus, a so-called passive type seat belt is electively preferred wherein the belt is automatically and immediately secured in place after an occupant sits down and closes the vehicle door. The passive seat belt is arranged to extend between a central side position of the vehicle and an anchor plate attached to a door sash behind the door across the seat, so that it may automatically be secured to fasten the upper body portion of the occupant when he/she gets into the vehicle.

In a traditional seat belt support structure, a bracket 1 is fixdely secured on the outer surface of the inner panel 2b of the door sash 2a of the door 2 by means of screw 3 for holding an anchor plate which supports the seat belt in position, as shown in FIG. 4. In this structure, since the screw 3 fixdely securing the bracket 1 is exposed to be visible from the exterior when the door 2 is opened, an aesthetical feature of the vehicle is impaired. Moreover, because of the presence of the screw 3 projecting, it is difficult to provide a sealing surface for a weather strip which is used to seal a clearance between an inner panel 2b of the door sash 2a and a center pillar 4, and thus the weather strip 5 must be arranged in such a fashion as shown in FIG. 4, and as a consequence its sealing characteristics remain unimproved.

OBJECTS AND SUMMARY OF THE INVENTION

The present invention has been made with the prior art as described above taken into account, and its main object is to provide a seat belt support structure wherein an attachment portion of a bracket which supports and fixdely secures the anchor plate in position can be concealed to be invisible from the exterior, and wherein an improved sealing characteristic may be provided for a clearance between the door and the center pillar.

To accomplish the above-described object, the present invention provides a seat belt support structure wherein a bracket is fixdely secured on a door sash for holding an anchor plate which supports the seat belt the structure being characterized in that said bracket, for fixdely securing the anchor plate is attached to the inner surface of the outer panel of said door sash and its attachment portion is concealed by a door glass run which is used to hold the door window glass.

BRIEF DESCRIPTION OF DRAWINGS

FIG. 1 through FIG. 3 illustrate one embodiment of the seat belt support structure in accordance with the present invention, wherein;

FIG. 1 is a perspective view of a vehicle;

FIG. 2 is a cross-sectional view along a line 30—30 in FIG. 1;

FIG. 3 is a view conceptionally illustrating a vehicle door; and

DETAILED DESCRIPTION OF PREFERRED EMBODIMENTS

One embodiment of the seat belt support structure in accordance with the present invention will be described in detail hereinbelow by way of example, making reference to accompanying drawings.

Figure 3:
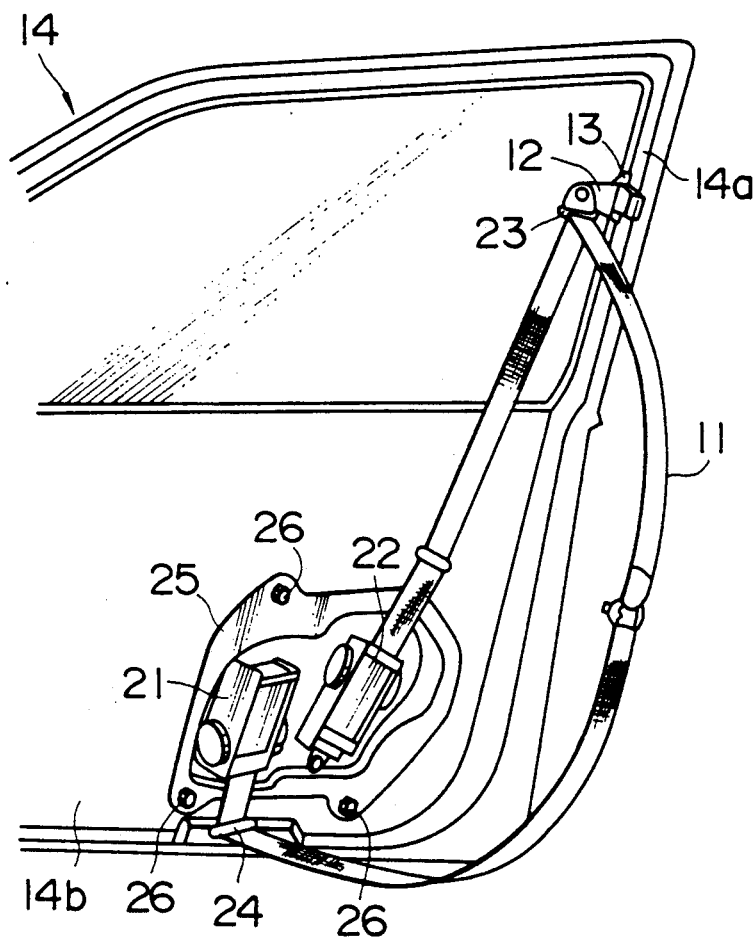
Figure 4:
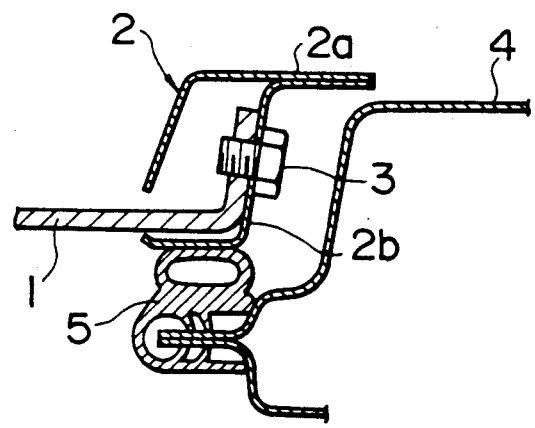
FIG. 4 is a cross-sectional view illustrating essential portions of the seat belt support structure of the prior art.

FIG. 1 through FIG. 3 illustrate one embodiment of the present invention.

The seat belt support structure of this embodiment is provided as secured on a vehicle 10 door 14. The seat belt 11 is supported at its upper portion on an anchor plate 12. The anchor plate 12 has one end portion 13a of its fixing bracket 13 fixedly secured on the inner surface of the outer panel 14b by means of screw 15 which may be inserted from the exterior. The attachment portion 14c of the door sash 14a is arranged to be concealed by a door glass run 17 which holds and fixdely secures the window glass 16 of the door 14. Thus, the screw 15 is made invisible from the exterior and consequently an improved aesthetical feature can be realized. Additionally, because screws do not project outwardly through the inner panel 14d of the door sash 14a unlike in a prior art, a sufficient sealing surface may be readily realized to seal a clearance between the inner panel 14d of the door sash and a center pillar 18, and thereby allowing the weather strip 19 to be easily arranged for this sealing purpose.

Alternately, the door glass run 17 has an overlapping portion 14e of the front end of the door sash 14a received in its one end portion 17a, and a window glass 16 received in its opposite end portion 17b to hold it on the door sash 14a.

The weather strip 19 is provided to fixdely engage in a metal fitting 20 provided on a smooth step portion substantially at a central portion of the inner panel 14d of the door sash 14a.

Meanwhile, there are further illustrated in FIG. 3 a lap retractor 21, a shoulder retractor 22 and through rings 23 and 24. The through ring 23 is attached to an anchor plate 12 which is mounted on a sash portion 14a to support the seat belt 11 withdrawn from the shoulder retractor 22. On the other hand, the through ring 24 is attached to the inner panel 14b of the door 14 to support the seat belt 11 withdrawn from the lap retractor 21.

The lap retractor 21 and the shoulder retractor 22 are attached to a common bracket 25, and received in an opening (not shown) which is formed in the lower portion of the inner panel 14b and in which a bracket is engaged by means of bolt 26.

As described hereinbefore, the seat belt support structure of the invention is arranged wherein the anchor plate is attached on the inner surface of the outer panel of the door sash for fixdely securing the bracket in position, and its attachment portion is concealed by the door glass run which holds the door window glass, and thus the attachment portion is made invisible from the exterior for thereby realizing an aesthetically advantageous feature for the vehicle.

Furthermore, the securing bracket is fixdely secured on the outer panel of the door sash and therefore screws and the like do not project outwardly through the inner panel, resulting in that a smooth sealing surface may be ensured between the inner panel of the door sash and the center pillar to seal a clearance between these two members. In this way, it is easy to arrange sealing members and thus improve sealing characteristics of the vehicle.

We claim:

1. A seat belt support structure, comprising:
    a door sash formed with an outer panel facing a door glass element and an inner panel facing an automobile body structure, said inner panel and said outer panel being joined at at least one overlap region and defining an interior space between said inner panel and said outer panel;
    an anchor plate fixedly secured to said door sash outer panel through a fixing bracket extending into said interior space and through a screw member connecting said fixing bracket to said outer panel, said screw member extending into said interior space and having a screw head on an exterior side of said outer panel, facing the door glass element;
    a door glass run for guiding a door window glass element, said door glass run being positioned concealing said screw head and said at least one overlapping portion of said inner panel and said outer panel.

2. A seat belt support structure, comprising a seat belt anchor plate connected to an automobile door element, said automobile door element including a door sash with an outer panel facing a door window glass element and an opposite inner panel, said anchor plate being connected to a fixing bracket;
    a screw element engaged with said outer panel extending to an interior side of said outer panel for fixing said fixing bracket to said outer panel at said interior side, said screw having a screw head on an outer side of said outer panel, opposite the door window glass element, said outer panel and said inner panel being connected at an overlapping portion;
    a door glass run for holding the door window glass element in position, said door glass run being arranged for concealing, at one end of said door glass run, said overlapping portion of said inner panel and said outer panel and at another end of said door glass run concealing said screw head, exposed to the outside of said outer panel, said door run being positioned at a fixing bracket attachment portion of said outer panel.

* * * * *